United States Patent [19]

Cochran, Jr.

[11] Patent Number: 4,671,994

[45] Date of Patent: Jun. 9, 1987

[54] METHOD FOR PRODUCING FIBER REINFORCED HOLLOW MICROSPHERES

[75] Inventor: Joe K. Cochran, Jr., Marietta, Ga.

[73] Assignee: Materials Technology Corporation

[21] Appl. No.: 827,457

[22] Filed: Feb. 10, 1986

[51] Int. Cl.$^4$ .......................... B32B 5/16; C03C 25/02
[52] U.S. Cl. ........................................ 428/325; 65/214; 376/152; 376/411; 376/457; 376/916; 428/327; 428/328; 428/402
[58] Field of Search ............... 428/325, 328, 327, 402, 428/406; 376/152, 411, 457, 916; 65/21

[56] References Cited

U.S. PATENT DOCUMENTS 4,303,731 12/1981 Torobin .............................. 428/402

Primary Examiner—Marion C. McCamish
Attorney, Agent, or Firm—Perry Carvellas

[57] ABSTRACT

Fiber reinforced hollow film forming material microspheres 17 made from a fiber and film forming material composition are described. The fiber reinforced hollow microspheres 17 are used to make shaped and molded articles and to make insulation materials. The fibers can be made from ceramic materials, glass, metal, metal glass and plastic. The reinforcing fibers can be one-half to five microns in diameter and five to one hundred microns in length.

60 Claims, 6 Drawing Figures

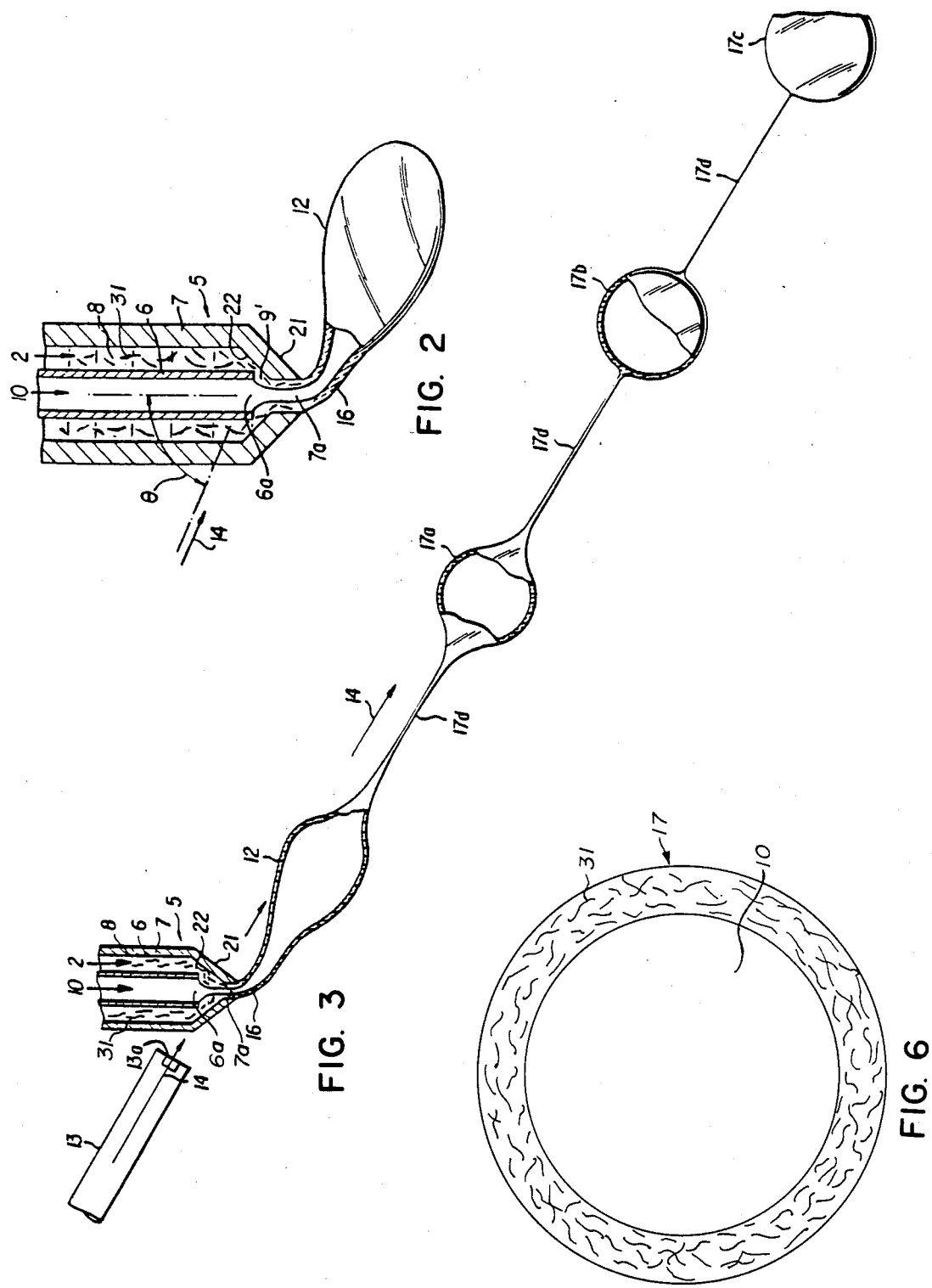

METHOD FOR PRODUCING FIBER REINFORCED HOLLOW MICROSPHERES

This invention relates to fiber reinforced hollow film forming material microspheres 17 made from a fiber and film forming material composition are described. The fiber reinforced hollow microspheres 17 are used to make shaped and molded articles and to make insulation materials.

The fibers can be made from ceramic materials, glass, metal, metal glass and plastic. The reinforcing fibers can be one-half to five microns in diameter and five to one hundred microns in length.

The fiber reinforced hollow microspheres 17 are made by forming a liquid film of a fiber and molten or liquid film forming material composition across a coaxial blowing nozzle 5, applying a blowing gas 10 at a positive pressure on the inner surface of the liquid film to blow the film and form an elongated cylinder-shaped liquid film 12 of molten film forming material. A transverse jet 13 is used to direct an inert entraining fluid 14 over and around the blowing nozzle 5 at an angle to the axis of the blowing nozzle. The entraining fluid 14 as it passes over and around the blowing nozzle 5 fluid dynamically induces a pulsating or fluctuating pressure field at the opposite or lee side of the blowing nozzle in the wake or shadow of the coaxial blowing nozzle. The continued movement of the entraining fluid 14 over the elongated cylinder 12 produces asymmetric fluid drag forces on the cylinder and closes and detaches the elongated cylinder from the coaxial blowing nozzle and the detached cylinder by the action of surface tension forms into a spherical shape 17.

Quench nozzles 18 are disposed below and on either side of the blowing nozzle 5 and direct cooling fluid 19 at and into contact with the fiber and molten film forming material microspheres 17 to rapidly cool and solidify the molten fiber forming material to form a hard, smooth fiber reinforced hollow microsphere 17.

The fibers are wetted by the molten or liquid film forming material and on cooling and/or hardening the microspheres the fibers are adhered or otherwise bonded to each other and to the cooled and/or hardened film forming material.

The fiber reinforced hollow film forming material microspheres 17 can be used as filler materials in plastics, in plastic foam compositions and in concrete and asphalt compositions.

The fiber reinforced hollow microspheres 17 can be made from low heat conductivity film forming material compositions. The microspheres can be used to make improved insulation materials and composites and insulating systems.

The fiber reinforced hollow microspheres 17 can also be made in the form of filamented microspheres 17a, b and c with a thin filament 17d connecting adjacent microspheres 17a, b and c.

BACKGROUND OF THE INVENTION

In recent years, the substantial increases in costs of basic materials such as plastics, cement, asphalt and the like has encouraged development and use of filler materials to reduce the amount and cost of the basic materials used and the weight of the finished materials. One of the newly suggested filler materials utilizes hollow glass or plastic microspheres. The known methods for producing hollow glass or plastic microspheres for use as filler materials, however, have not been successful in producing microspheres of uniform size or uniform thin walls which makes it very difficult to produce filler and insulation materials of controlled and predictable physical and chemical characteristics and quality.

In recent years, the substantial increases in the energy costs of heating and cooling has also encouraged the development of new and better insulation materials and many new insulation materials have been developed in an attempt to satisfy this need.

The known methods for producing hollow glass, plastic or metal microspheres, other than the L. B. Torobin patents discussed below, have not been successful in producing microspheres of relatively uniform size or uniform thin walls which made it very difficult to produce materials of controlled and predictable characteristics and quality.

One of the existing methods of producing hollow glass microspheres, for example, as disclosed in the Veatch, et. al. U.S. Pat. No. 2,797,201 or Beck, et. al. U.S. Pat. No. 3,365,315 involves dispersing a liquid and/or solid gas-phase precursor material in the glass material to be blown to form the microspheres. The glass material containing the solid or liquid gas-phase precursor enclosed therein is then heated to convert the solid and/or liquid gas-phase precursor material into a gas and is further heated to expand the gas and produce the hollow glass microspheres containing therein the expanded gas. This process is, understandably, difficult to control and of necessity, i.e. inherently, produces glass microspheres of random size and wall thickness, microspheres with walls that have sections or portions of the walls that are relatively thin, walls that have holes, small trapped bubbles, trapped or dissolved gases, any one or more of which will result in a substantial weakening of the microspheres, and a substantial number or proportion of microspheres which are not suitable for use and must be scrapped or recycled.

Neither the Veatch, et. al. U.S. Pat. No. 2,797,201 nor Beck, et. al. U.S. Pat. No. 3,365,315 disclose adding fibers to the glass microspheres to reinforce and strengthen the microspheres.

Though there have been recently described methods of producing uniform size hollow glass microspheres (Torobin U.S. Pat. No. 4,303,431), uniform size hollow metal microspheres (Torobin U.S. Pat. No. 4,415,512) and uniform size plastic microspheres (Torobin U.S. Pat. No. 4,303,603), there has been no teaching of adding fibers to the glass, metal or plastic materials to make fiber reinforced hollow microspheres and/or to improve the tensile strength of the microspheres.

The known methods for producing hollow glass, metal or plastic microspheres have not been used to make fiber reinforced hollow microspheres.

BRIEF DESCRIPTION OF THE INVENTION

The present invention can use the apparatus described in the Torobin U.S. Pat. No. 4,303,431 to carry out the process of the present invention. The U.S. Pat. No. 4,303,431 is incorporated herein in its entirety by reference thereto.

The present invention relates to fiber reinforced hollow microspheres and to a method of making the fiber reinforced hollow microspheres.

The reinforcing fibers can be made from ceramic materials, glass, plastic, metal and metal glass. The fibers can be one-half to five microns in diameter and five to one hundred microns in length.

The hollow microspheres can be made from inorganic film forming materials, such as glass, metal and metal glass, and from organic film forming materials, such as organic polymers and copolymers, resins and plastics.

The fiber reinforced hollow microspheres can be used as filler materials to make shaped and molded articles, e.g. in molded resins and plastics. The fiber reinforced hollow microspheres can be used as fillers or aggregates to make formed wall panels and as fillers or aggregates in cements, concrete and asphalt.

The fiber reinforced microspheres can be used to form an insulating material or panel by using as a blowing gas a low heat conductivity gas.

The fiber reinforced hollow microspheres are made by adding fibers to a molten and/or liquid film forming material, for example, glass, metal or plastic, to obtain a fiber and molten or liquid film forming material composition.

The fiber and film forming material composition is used to form a liquid film, having an inner and outer surface, of the composition across a coaxial blowing nozzle. A positive pressure of an inert blowing gas is applied to the inner surface of the film to form an elongated cylinder-shaped liquid film of the molten film forming material which is closed at its outer end. A balancing but slightly lower gas pressure is provided in the area of the blowing nozzle into which the elongated cylinder-shaped liquid film is blown.

A transverse jet is used to direct an entraining fluid over and around the blowing nozzle at an angle to the axis of the blowing nozzle. The entraining fluid as it passes over and around the blowing nozzle and the elongated cylinder fluid dynamically induces a pulsating or fluctuating pressure field at the opposite or lee side of the blowing nozzle in the wake or shadow of the blowing nozzle. The fluctuating pressure field has regular periodic lateral oscillations similar to those of a flag flapping in a breeze.

The entraining fluid envelops and acts asymmetrically on the elongated cylinder and causes the cylinder to flap, fold, pinch and close-off at its inner end at a point proximate to the coaxial blowing nozzle. The continued movement of the entraining fluid over the elongated cylinder produces fluid drag forces on the cylinder and detaches the elongated cylinder from the coaxial blowing nozzle to have it fall free from the blowing nozzle. The surface tension forces of the molten film forming material composition act on the now free, entrained elongated cylinder and cause the cylinder to seek a minimum surface area and to form a spherical shape.

Quench nozzles are disposed below and on either side of the blowing nozzle and direct cooling fluid at and into contact with the molten film forming material microspheres to rapidly cool and solidify the molten material and form a hard, smooth hollow film forming material microsphere.

The reinforcing fibers are selected to be of a material which is not substantially deformed or chemically changed during the heating step. The reinforcing fibers during the heating and/or blowing step can be slightly softened and are adhered or otherwise bonded to each other and to the film forming material. The fibers are wetted by the molten and/or liquid film forming material and on cooling and/or hardening of the film forming material are adhered or otherwise bonded to each other and to the film forming material. Wetting agents as necessary can be added to the film forming composition. The reinforcing fibers on cooling and/or hardening of the microspheres can form a loose mat network and are evenly distributed in the walls of the microspheres.

In one embodiment of the invention, the fiber reinforced microspheres are coated with an adhesive or foam, heated, if necessary, and flattened to an oblate spheroid or a generally cellular shape. The fiber reinforced microspheres are held in the flattened position until the adhesive hardens and/or cures after which the microspheres retain their flattened shape. The use of the flattened fiber reinforced microspheres substantially reduces the volume of the interstices between the microspheres and significantly improves the thermal insulating characteristics of the microspheres.

The present invention also relates to filamented fiber reinforced hollow film forming material microspheres and to a method for making filamented fiber reinforced hollow film forming material microspheres with thin filaments of the same material from which microspheres are made connecting the microspheres to each other.

The filamented fiber reinforced microspheres are made in a manner such that they are connected or attached to each other by a thin continuous film forming material filament. The filamented microspheres can also be flattened to produce the oblate spheroids. The addition of the reinforcing fibers to the film forming material acts to generally strengthen the connecting filaments. The fiber reinforced hollow film forming material microspheres, depending on their diameter and their wall thickness and the particular material compositions from which they are made, are capable of withstanding high internal gas pressures, and high external gas or liquid pressures and/or weight.

OBJECTS OF THE INVENTION

It is an object of the present invention to provide a method for making fiber reinforced hollow microspheres from film forming materials.

It is another object of the present invention to make fiber reinforced hollow microspheres from organic and inorganic film forming materials.

It is another object of the present invention to make fiber reinforced hollow microspheres for use as filler materials.

It is another object of the present invention to make fiber reinforced hollow microspheres for use as and/or in insulating materials.

It is another object of the present invention to produce fiber reinforced hollow film forming material microspheres having fibers uniformly distributed in the walls of the microspheres, having uniform diameters, having uniformly thick walls which walls are substantially free of trapped gas bubbles or dissolved gases or solvents which can form bubbles.

It is another object of the present invention to produce fiber reinforced hollow film forming material microspheres which have walls that are free of holes or thin walled portions, and walls and the contained volume of the microspheres that are free of latent blowing gase and latent blowing gas materials.

It is another object of the present invention to produce fiber reinforced microspheres containing a low heat conductivity gas.

It is another object of the present invention to utilize the fiber reinforced hollow microspheres in the manufacture of syntactic foam systems and/or in the manufacture of molded forms, shapes or panels.

It is another object of the present invention to produce fiber reinforced hollow microspheres from a low heat conductivity film forming material and to blow the microspheres with a low heat conductivity gas, such that the formed microspheres contain a low heat conductivity gas are are useful in making insulating materials.

It is another object of the present invention to produce in an economical simple manner fiber reinforced hollow film forming material microspheres which are substantially spherical in shape, uniform in diameter, wall thickness and strength.

It is another object of the present invention to produce fiber reinforced hollow film forming material microspheres having high tensile strength to contain gases at high internal gas pressures.

It is still another object of the present invention to produce fiber reinforced film forming material filamented microspheres with thin connecting filaments, of the same material from which the microspheres are made, connecting adjacent hollow microspheres.

THE ADVANTAGES

The process of the present invention allows the production of fiber reinforced microspheres having predetermined characteristics such that improved filler materials and insulation materials and systems can be designed, manufactured and tailor made to suit a particular desired use. The diameter, wall thickness and uniformity, strength and thermal characteristics of the microspheres can be determined by carefully selecting the constituents of the film forming material composition and the fiber material, fiber diameter and length and volume percent of fiber, and controlling the blowing gas pressure and the temperature, and the temperature, viscosity, surface tension, and thickness of the molten film from which the microspheres are formed. The inner volume of the microspheres can contain an inert gas used to blow the microspheres.

The process of the present invention provides for the production of fiber reinforced hollow microspheres at economic prices and in large quantities. The process of the present invention provides for the production of fiber reinforced hollow microspheres for use as filler materials at economic prices and in large quantities.

The process of the present invention provides a practical and economical means by which fiber reinforced hollow microspheres can be manufactured and used to prepare a relatively low cost efficient insulating material.

The process of the present invention, as compared to the prior art processes of using a latent liquid or solid blowing agent, can be conducted at higher temperatures since there is no included expandable and/or decomposable blowing agent used. The ability to use higher blowing temperatures results in for particular molten film forming material compositions a lower viscosity which allows surface tension forces to produce significantly greater uniformity in wall thickness, sphericity and diameter of the microspheres produced.

The process of the present invention allow the use of a wide variety of blowing gases and blowing gas materials to be used and encapsulated.

In addition, the surface of the hollow microspheres, because of the method by which they are made, do not have, i.e. are free of sealing tips.

BRIEF DESCRIPTION OF THE DRAWINGS

The attached drawings illustrate exemplary forms of the method and apparatus of the present invention for making fiber reinforced hollow glass, metal and plastic microspheres for use as filler materials and/or in and as insulating materials.

The FIG. 1 of the drawings shows in cross-section a coaxial blowing nozzle means for supplying molten fiber forming material and for supplying the gaseous material for blowing the molten material to form the hollow microspheres, a transverse jet providing an entraining fluid to assist in the formation and detachment of the microspheres form the blowing nozzles, and means for supplying a quench fluid to cool the microspheres.

Figure 1:
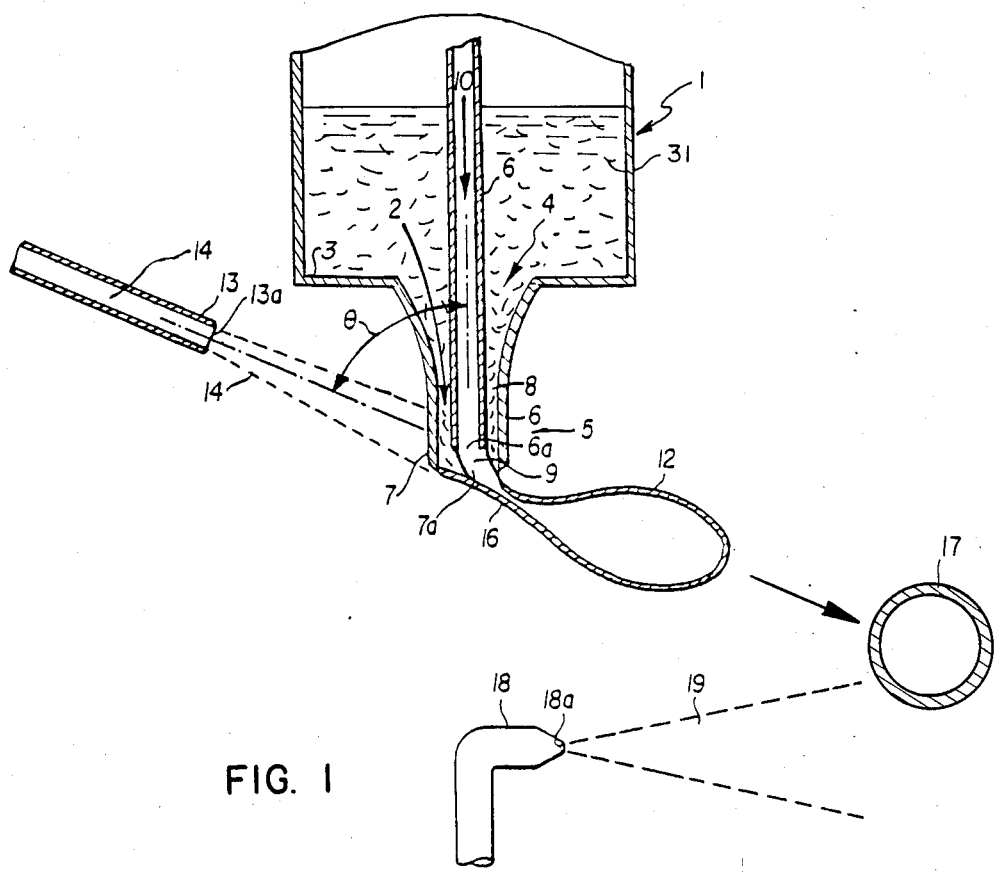

The FIG. 2 of the drawings is a detailed cross-section of a modified form of the nozzle means shown in FIG. 1 in which the lower end of the nozzle means is tapered inwardly.

The FIG. 3 of the drawings illustrates the use of the apparatus of FIG. 2 to make filamented fiber reinforced hollow microspheres.

Figures 4, 5:
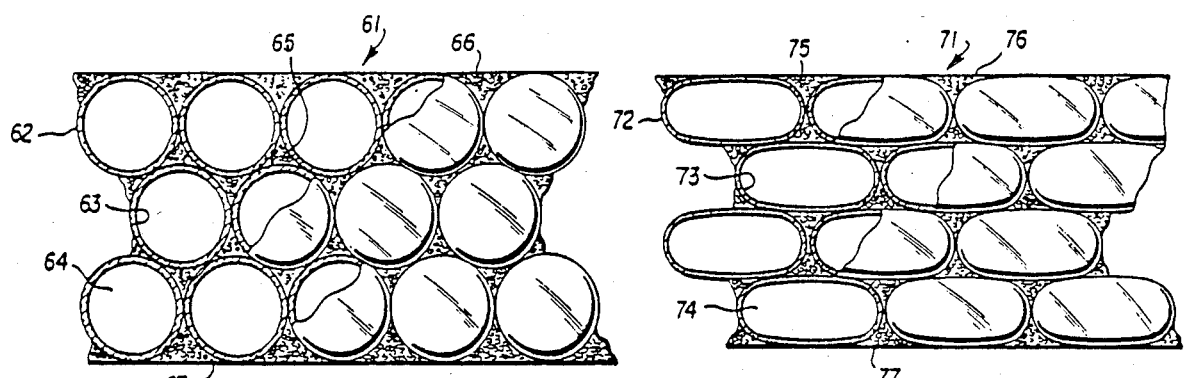

The FIG. 4 of the drawings shows a cross-section of spherical-shaped hollow microspheres made into a formed construction wall panel or an insulation panel.

The FIG. 5 of the drawings shows a cross-section of oblate spheroid shaped hollow microspheres made into a formed construction wall panel or insulation panel.

The FIG. 6 of the drawings shows a detailed cross-section of an enlarged microsphere 17 of FIG. 1 and shows reinforcing fibers 31 uniformly dispersed throughout the wall of the microsphere.

DETAILED DISCUSSION OF THE DRAWINGS

The invention will be described with reference to the accompanying Figures of the drawings wherein like numbers designate like parts throughout the several views.

Referring to FIG. 1 of the drawings, there is illustrated a vessel 1, made of suitable refractory material and heated by means not shown for holding the fiber 31 and molten film forming material composition 2. The bottom floor 3 of vessel 1 contains an opening 4 through which fibers and molten film forming material composition 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for a blowing gas and an outer nozzle 7 having an orifice 7a for the fiber and molten fiber forming material composition. The inner nozzle 6 is disposed within and coaxial to outer nozzle 7 to form annular space 8 between nozzles 6 and 7, which annular space provides a flow path for the fibers and molten material composition 2. The orifice 6a of inner nozzle 6 terminates at or a short distance above the plane of orifice 7a of outer nozzle 7.

The fibers and molten material composition 2 at about atmospheric pressure or at elevated pressure flows downwardly through annular space 8 and fills the area between orifice 6a and 7a. The surface tension forces in molten film forming material composition 2 form a thin liquid molten film 9 across orifice 6a and 7a. The fibers as they pass through annular space 8 and orifice 6a and 7a become generally aligned such that they become generally parallel to the walls of the microspheres as the microspheres are being formed.

A blowing gas 10, e.g. inert blowing gas, which is heated by means not shown to about the temperature of the fiber and molten film forming material composition and which is at a pressure above the molten composition pressure at the blowing nozzle, is fed through distribution conduit 11 and inner coaxial nozzle 6 and brought into contact with the inner surface of molten composition film 9. The blowing gas exerts a positive pressure on the molten composition film to blow and distend the film outwardly to form an elongated cylinder-shaped liquid film 12 of molten material composition filled with the blowing gas. The elongated cylinder 12 is closed at its outer end and is connected at its inner end to outer nozzle 7 at the peripheral edge of orifice 7a. A balancing pressure of a gas or of an inert gas, i.e. at a slightly lower pressure, is provided in the area of the blowing nozzle into which the elongated cylinder-shaped liquid film is blown.

A transverse jet 13 is used to direct an inert entraining fluid 14, which is heated to about, below or above the temperature of the fiber and molten film forming material composition 2, by means not shown. The entraining fluid 14 is fed through nozzle 13 and transverse jet nozzle orifice 13a and directed at the coaxial blowing nozzle 5. The transverse jet 13 is aligned to direct the flow of entraining fluid 14 over and around blowing nozzle 7 in the microsphere forming region at and behind the orifice 7a. The entraining fluid 14 as it passes over and around blowing nozzle 5 fluid dynamically induces a pulsating or fluctuating pressure field in the entraining fluid 14 at the opposite or lee side of blowing nozzle 5 in its wake or shadow.

The entraining fluid 14 envelops and acts on the elongated cylinder 12 in such a manner as to cause the cylinder to flap, fold, pinch and close-off at its inner end at a point 16 proximate to the orifice 7a of outer nozzle 7. The continued movement of the entraining fluid 14 over the elongated cylinder 12 produces fluid drag forces on the cylinder 12 and detaches it from the orifice 7a of the outer nozzle 7 to allow the cylinder to fall, i.e. be entrained and transported away from nozzle 7a. The surface tension forces of the fiber and molten film forming material composition act on the entrained, falling elongated cylinder 12 and cause the cylinder to seek a minimum surface area and to form a spherical shape fiber reinforced hollow microsphere 17.

Quench nozzles 18 having orifices 18a are disposed below and on both sides of coaxial blowing nozzle 5 and direct cooling fluid 19 at and into contact with the fiber and molten material composition microsphere 17 to rapidly cool and solidify the molten material and form a hard, smooth fiber reinforced hollow microsphere 17. The quench fluid 19 also serves to carry the fiber reinforced hollow microsphere away from the coaxial blowing nozzle. Additional cooling time, if necessary, can be provided by using a fluidized bed, liquid carrier or belt carrier system for the fiber reinforced hollow microspheres to harden the microspheres with substantially little or no distortion or effect on the size or shape of the microspheres. The cooled and solidified fiber reinforced hollow microspheres are collected by suitable means not shown.

The FIG. 2 of the drawings illustrates a preferred embodiment in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a. The figure of the drawings also shows elongated cylinder-shaped liquid film 12 with a pinched portion 16.

The use of the tapered nozzle 21 construction was found to substantially assist in the formation of a thin fiber and molten film forming material composition film 9' in the area between orifice 6a of inner nozzle 6 and orifice 7a of outer nozzle 7. The inner wall surface 22 of the taper portion 21 of the outer nozzle 7 when pressure is applied to fiber and molten composition 2 forces the fiber and molten composition 2 to squeeze through a fine gap formed between the outer edge of orifice 6a and the inner surface 22 to form the thin fiber and molten film 9 across orifice 6a and 7a. Thus, the formation of the molten film 9 does not in this embodiment rely solely on the surface tension properties or the molten film forming material. The illustrated coaxial nozzle allows making hollow microspheres of smaller diameter than those made using the FIG. 1 apparatus and is particularly useful in blowing high viscosity fiber and molten film forming material compositions.

The diameter of the microsphere is determined in part by the diameter of orifice 7a. This apparatus allows the use of larger inner diameters of outer nozzle 7 and larger inner diameters of inner nozzle 6, which reduce the possibility of plugging of the coaxial nozzles when in use. The features are particularly advantageous in preventing plugging when the molten composition contains relatively large diameter and/or relatively long fibers.

The FIG. 3 of the drawings illustrates another embodiment of the present invention in which a high viscosity fiber and film forming material composition is used to blow fiber reinforced hollow filamented microspheres. In this Figure, the elongated-shaped cylinder 12 and hollow microspheres 17a, 17b and 17c are connected to each other by thin filaments 17d. As can be seen in the drawing, as the microspheres 17a, 17b and 17c progress away from blowing nozzle 5 surface tension forces act on the elongated cylinder 12 to effect the gradual change of the elongated-shaped cylinder 12 to the generally spherical shape 17a, more spherical shape 17b and finally the spherical shape microsphere 17c. There is a gradual reduction in the diameter of the connecting filaments 17d, as the distance between the microspheres and filaments and the blowing nozzle 5 increases. The fiber reinforced hollow microspheres 17a, 17b and 17c that are obtained are connected by thin filament portions 17d that are substantially of equal length and that are continuous with the hollow microsphere.

The operation of the apparatus illustrated in FIGS. 2 and 3 is similar to that discussed above with regard to FIG. 1 of the drawings.

The entire apparatus of the embodiments disclosed in FIGS. 1 to 3 can be enclosed in a high pressure containment vessel, not shown, which allows the process to be carried out at elevated pressures.

The FIG. 4 of the drawings illustrates the use of the fiber reinforced hollow microspheres, e.g. glass, metal or plastic microspheres, of the present invention in the construction of a formed panel 61. The panel contains multiple layers of uniform sized fiber reinforced microspheres 62. The internal volume of the fiber reinforced microspheres can be filled with a low heat conductivity gas 64 and the interstices 65 between the microspheres can be filled with a low heat conductivity foam containing a low heat conductivity gas.

The FIG. 5 of the drawings illustrates the use of the fiber reinforced hollow microspheres, e.g. glass, metal or plastic microspheres, of the present invention in the construction of a formed panel 71. The panel contains multiple layers of uniform sized flattened oblate spheroid-shaped fiber reinforced hollow microspheres 72. The microspheres can be heated and flattened and fused together while flattened and allowed to cool and harden. The cooled and hardened microsphere maintain the flattened shape. The internal volume of the microsphere can be filled with a low heat conductivity gas 74. The flattened configuration of the microspheres substantially reduces the volume of the interstices between the microspheres which can be filled with a low heat conductivity foam 75 containing a low heat conductivity gas.

The FIG. 6 of the drawings shows a detailed cross-section of an enlarged microsphere 17 of FIG. 1 and shows reinforcing fibers 31 uniformly dispersed throughout the wall of the microspheres. The fibers 31 are disposed generally parallel to the inner and outer wall surfaces of the microsphere and are adhered or bonded to each other and to the hardened molten film forming material forming the wall of the microsphere. The contained volume of the microsphere contains the blowing gas 10.

REINFORCING FIBERS

The reinforcing fibers can be selected from a wide variety of materials which include ceramic materials (e.g. silicon carbide, silicon nitride, carbon and aluminum oxide), glasses, metals, metal glasses and plastics (e.g. organic resins).

The relationship between the fiber diameter and length and relationship to the wall thickness of the fiber reinforced microspheres are shown in the following Table I.

TABLE I

| | Reinforcing Fibers | | |
|---|---|---|---|
| | Broad | Preferred | More Preferred |
| Diameter (microns) | 0.2 to 10 | 0.4 to 5 | 0.5 to 3 |
| Length (microns) | 2 to 500 | 5 to 100 | 5 to 20 |
| Ratio D/L | 1:3 to 1:100 | 1:5 to 1:50 | 1:10 to 1:20 |
| Ratio Length to Microsphere Wall Thickness | 1:10 to 10:1 | 1:5 to 5:1 | 1:5 to 2:1 |
| Fibers (Volume %) | 3 to 30 | 10 to 25 | 15 to 20 |

CERAMIC FIBERS

The ceramic materials from which the reinforcing fibers can be made include silicon carbide, silicon nitride, carbon, graphite and aluminum oxide.

The silicon carbide fibers are available in diameters of 0.5 to 10 microns.

The silicon nitride fibers are available in diameters of 1 to 10 microns.

The carbon fibers are available in diameters of 5 to 8 microns.

The aluminum oxide fibers are available in diameters of 1 to 10 microns.

The fibers throughout their length are of uniform diameters.

The fibers can be cut to the desired lengths by conventional means, e.g. by pumping a fiber slurry through a refiner or by ball milling or rod milling.

Other ceramic materials that can be used to make fibers are berillium oxide, boron carbide, zirconium oxide and boron nitride.

GLASS FIBERS

The glass materials from which the reinforcing fibers can be made include the conventional glass materials used to make fiber glass insulation. The fiber glass insulation is available in diameters of 0.5 to 10 microns and in lengths of 0.5 to 6 inches.

The glass fiber materials that can be used include those disclosed in the Torobin U.S. Pat. No. 4,363,646, the entire disclosure of which is incorporated herein by reference. These fibers can be made in diameters of 0.5 to 30 microns and in lengths of 0.5 to 6 inches. The fibers can be cut to the desired length by conventional means.

Other glass fiber materials that can be used are fused silica, "E" Glass, "D" Glass, "S" Glass and a variety of other commercial glass compositions.

METAL FIBERS

The metal fiber materials from which the reinforcing fibers can be made include steel, nickel, gold, copper, tungsten, chromium and iron.

The metal and metal glass fiber materials that can be used include those disclosed in the Torobin U.S. Pat. No. 4,525,314, the entire disclosure of which is incorporated herein by reference. Those fibers can be made in diameters of 0.5 to 30 microns and in lengths of 0.5 to 6 inches. The fibers can be cut to the desired length by conventional means.

PLASTIC FIBERS

The plastic fiber materials that can be used are made from organic resins and/or polymers and can include Nylon, Rayon and Orlon.

Other plastic fiber materials that can be used include those disclosed in the Torobin U.S. Pat. No. 4,536,361, the entire disclosure of which is incorporated herein by reference. Those fibers can be made in diameters of 0.5 to 30 microns and in lengths of 0.5 to 6 inches. The fibers can be cut to the desired length by conventional means.

The individual reinforcing fibers that are used are of substantially the same uniform diameter. The lengths, however, will vary and a relatively wide length size or a relatively narrow length size distribution of fibers can be used. The diameters of the reinforcing fibers can be selected to have a relatively narrow diameter size distribution or can be selected to have a relatively wide diameter size distribution.

Where less than about 3% by volume fibers based on total system are used there is little or no improvement obtained in the tensile strength of the fiber reinforced hollow microspheres.

Where more than about 30% by volume of fibers, based on the total system are used the blowing properties of the composition are adversely effected. The degree of adverse effect depends to some extent on the diameter and length of the fibers.

Generally it is preferred that the volume percent of fibers, based on the total system not exceed about 20% by volume of the total system.

The optimun tensile strength of the fiber reinforced hollow microspheres can be obtained by adding about 15 to 20% by volume fibers, based on total system, to the film forming material.

The reinforcing fibers are selected to be a material which is not substantially deformed or chemically changed during the heating and/or blowing steps. The reinforcing fibers during the heating and/or blowing steps can be slightly softened, wetted by the film forming material and adhere and/or otherwise bonded to each other and to the molten or liquid film forming material. Wetting agents as necessary can be added to the film forming composition.

The reinforcing fibers on cooling and/or hardening of the microspheres can form a loose mat network and are evenly distributed in the walls of the microspheres.

The reinforcing fibers can be made from the same material or from a different material than the film forming material.

FILM FORMING MATERIAL COMPOSITIONS

The film forming material compositions can be selected from a wide variety of inorganic fiber forming materials such as glass and metal, and organic film forming materials such as organic polymers, copolymers and resins.

The fiber and film forming material composition constituents can be selected such that the fiber reinforced microspheres that are obtained have high compressive and high tensile strength.

GLASS MATERIAL COMPOSITIONS

The constituents of the glass compositions can vary widely, depending on their intended use, and can include naturally occurring and synthetically produced glass materials.

The glass compositions preferably contain relatively large amounts of silicon dioxide, alumina, lithium, zirconia, and lime and relatively small amounts of soda. Calcium can be added to assist in melting the glass and boric oxide can be added to improve the weathering properties of the glass. The glass compositions are formulated to have relatively high melting and fluid flow temperatures with a relatively narrow temperature difference between the melting, i.e. fluid flow and hardening temperatures. The glass compositions are formulated such that they have a high rate of viscosity increase with decreasing temperature so that the microsphere walls will solidify, harden and strengthen before the blowing gas within the sphere decreases in volume and pressure a sufficient amount to cause the microsphere to collapse.

The glass compositions suitable for use in the present invention can have the range of proportions disclosed in Torobin U.S. Pat. No. 4,303,431, the disclosure of which is incorporated by reference.

The use of glass compositions containing a relatively high alumina content and a relatively low soda content is found to produce a rapid hardening of the glass microspheres, which facilitated the production of glass microspheres.

For certain uses relatively low temperature melting glass compositions can be used. The low melting glass compositions can contain relatively large amounts of lead. Naturally occurring glass materials such as basaltic mineral compositions can also be used. The use of these naturally occurring glass compositions can in some cases substantially reduce the cost of the raw materials used.

To assist in the blowing and formation of the glass microspheres and to control the surface tension and viscosity of the spheres suitable surface active agents, such as colloidal particles of insoluble substances and viscosity stabilizers can be added to the glass composition as additives.

The tensile strength of the hollow glass microspheres is substantially increased by the addition, prior to blowing the microspheres, of fibers to the glass film forming material composition. The process of making the microsphere aligns the fibers, as the glass film is stretched in passing, i.e. extruded, through the conical blowing nozzle. The fibers are aligned with the walls of the hollow glass microsphere, i.e. the fibers become aligned generally parallel to the inner and outer microsphere wall surfaces.

METAL MATERIAL COMPOSITIONS

The film forming metal material and metal compositions and particularly the metal glass compositions from which the fiber reinforced hollow metal microsphere of the present invention can be made can be widely varied to obtain the desired physical characteristics for heating, blowing, forming, cooling and hardening the microspheres and the desired weight and strength characteristics of the fiber reinforced hollow metal microspheres produced. The metal compositions disclosed in the Torobin U.S. Pat. No. 4,415,512 can be used to carry out the present invention. The disclosure of the U.S. Pat. No. 4,415,512 patent is incorporated herein by reference in its entirety.

The constituents of the metal compositions can be selected and blended to be substantially free of trapped gas bubbles or dissolved gases in the walls of the microspheres which can form bubbles. The fiber reinforced hollow metal microspheres have sufficient strength when hardened and solidified to contain high internal gas pressures and to support a substantial amount of weight and/or to withstand a substantial amount of pressure.

The process of the present invention can be used to blow microspheres from suitable film forming metal materials or compositions, for example, metal glass alloy compositions, having sufficient viscosity at the temperature at which the microspheres are blown to form a stable film.

The film forming metal materials of the present invention, e.g. the metal glass alloy compositions depending on the constituents of the compositions, the wall thickness of the microspheres and the quench or cooling rate can form polycrystalline, partially polycrystalline and partially amorphous solid walls and substantially or completely amorphous solid walls.

The quench rates needed to obtain substantially or completely amorphous solids are in the order of $10^4$ to $10^{6}°C.$ per second.

The process of the invention can be used to form fiber reinforced hollow microspheres from metals such as iron, steel, nickel, gold, copper, zinc, tin, lead, aluminum and magnesium. In some cases in order to form microspheres from these materials, suitable additives are used which provide at the surface of a blown microsphere a sufficiently high viscosity such that a stable microsphere can be formed.

To assist in the blowing and formation of the metal microspheres and to control the surface tension and viscosity of the spheres suitable surface active agents, such as colloidal particles of insoluble substances and viscosity stabilizers can be added to the metal compositions as additives.

In an embodiment of the present invention metal glass compositions are used as the film forming metal material. The term metal glass(es) as used herein is intended to mean the metal alloy materials and compositions which on rapid cooling from a temperature above their liquidus temperature to below their glass temperature can form amorphous solids.

The term liquidus temperature as used herein is defined as the temperature at which the liquid and crystal phases of a metal alloy composition can exist in equilibrium, that is the temperature at which the crystalline phase can first appear when the liquid is cooled.

The term glass temperature as used herein is defined as the temperature at which the configuration of the metal alloy atoms become frozen in an amorphous solid state.

To form metal(lic) glass(es) it is necessary to rapidly cool the molten metal alloy composition from a temperature of about or just above the liquidus temperature to or below the metal glass temperature at a rate of $10^4$ to $10^{6}°$C. per second. Some metal glass or glassy metal alloys at temperatures of about their liquidus temperature can have viscosities of about 10 poises. At the glass temperatures, the metal glass alloy viscosities rapidly increase to about $10^{15}$ poises. Materials that resist change in shape this strongly are rigid enough to be considered solids, and are herein referred to as solids.

There are a wide variety of metal glass alloy compositions which can be used in accordance with the process and apparatus of the present invention to make hollow metal glass microspheres.

There is a substantial amount of published literature and a substantial number of patents which disclose various metal glass alloy compositions which are capable of forming partially, substantially or completely amorphous solids.

The Chen, et. al. U.S. Pat. No. 3,856,513 discloses metal glass alloy compositions which can form amorphous solids.

The Masumoto, et. al. U.S. Pat. No. 3,986,867 discloses metal glass alloy compositions which form amorphous alloys which have high heat resistance, high corrosion resistance and excellent mechanical properties.

The Ray, et. al. U.S. Pat. No. 4,366,638 discloses binary amorphous alloy compositions of iron or cobalt an boron which have high mechanical hardness and soft magnetic properties.

The Ray U.S. Pat. Nos. 4,210,443 and 4,221,592 disclose metal glass alloy compositions which form amorphous solids.

ORGANIC FILM FORMING MATERIAL AND PLASTIC COMPOSITIONS

The organic film forming material and compositions and particularly the plastic compositions from which the hollow plastic microspheres of the present invention are made can be widely varied to obtain the desired characteristics.

The constituents of the plastic compositions can vary, depending on their intended use and can include naturally occurring resins as well as synthetically produced plastic materials. The plastic compositions can be selected to have a low heat conductivity.

The constituents of the plastic compositions can be selected to be substantially free of trapped gas bubbles or dissolved gases in the walls of the microspheres which can form bubbles and to have sufficient strength when cured, hardened and solidified to withstand external pressure and/or weight.

The organic film forming material compositions that can be used include those disclosed in the Torobin U.S. Pat. No. 4,303,603, the disclosure of which is incorporated in its entirety by reference thereto.

The plastic compositions that can be used to form microspheres of the present invention include thermosetting and thermoplastic materials such as polyethylene, polypropylene, polystyrene, polyesters, polyurethanes, polychloro-trifluoroethylene, polyvinyl fluoride, polyvinylidene, polymethyl methacrylate acetyl, phenol-formaldehyde resins and silicone and polycarbonate resins. The plastic compositions also include organic materials such as cellulose acetate, cellulose acetate-butyrate, and cellulose acetate-propionate. The plastic compositions may consist essentially of the plastic material or may contain the plastic material dissolved or dispersed in a suitable solvent.

The plastic compositions disclosed in Veatch, et. al. U.S. Pat. No. 2,797,201 and the Morehouse, Jr. U.S. Pat. No. 3,615,972 can also be used in carrying out the present invention and the disclosure of said patents are accordingly incorporated herein in their entirety by reference.

There may be added to the plastic compositions chemical agents or additives which effect the viscosity of the compositions or of the surface film of the microsphere in order to obtain the desired viscosities needed to obtain a stable film for blowing the microspheres. Suitable chemical agents are materials that act as solvents for the plastic compositions. The solvents that are used will, of course, depend on the solubility in the solvent of the plastic composition used. Water, alcohols, ethers, esters, organic acids, hydrocarbons and chlorinated hydrocarbons can be used as solvents.

Additional plastic compositions suitable for use in the present invention are: Thermoplastic resins: Epoxy resins, phenolformaldehyde resins and Melmac.

The plastic compositions are formulated such that they have a high rate of viscosity increase with the hardening temperature or the thermosetting temperature such that the microsphere walls will solidify, harden and strengthen before the blowing gas within the sphere decreases in volume and pressure a sufficient amount to cause the microsphere to collapse.

In an embodiment of the present invention, fiber reinforced hollow microspheres can be made, without the use of a transverse jet, using certain relatively low viscosity film forming materials, for example, some metals and plastics, which have a relatively high density. The density of the film forming material is selected such that its weight is sufficient to pull the forming microsphere away from the coaxial blowing nozzle by the force of gravity before the microspheres harden. However, a transverse jet to move the forming microsphere away from the blowing nozzle is preferred.

BLOWING GAS

The fiber reinforced hollow microspheres and particularly the glass, metal and plastic microspheres can be blown with a gas, e.g. an inert gas.

The inert gases used to blow the fiber reinforced microspheres for use as insulation materials are selected to have a low heat conductivity and generally involve heavy gas molecules which do no transfer heat readily. Suitable blowing gases are argon, xenon, carbon dioxide, nitrogen, nitrogen dioxide, sulfur and sulfur dioxide. For certain uses, oxygen or air can be used as or added to the blowing gas.

The blowing gases that can be used include those disclosed in the Torobin U.S. Pat. No. 4,303,431.

PROCESS CONDITIONS

The glass film forming materials and/or compositions of the present invention are heated to a temperature of about 1800° to 3100° F. and maintained in a liquid, fluid form at the desired blowing temperature during the blowing operation. The glass compositions are heated to a temperature of 2000° to 2800° F., preferably 2300° to 2750° F. and more preferably 2400° to 2700° F., depending on the constituents of the composition.

The film forming metal materials and/or compositions of the present invention are heated to a temperature at which the are molten. The metal glass compositions are heated above their liquidus temperature and maintained in a liquid, fluid form during the blowing operation. Many of the known metal glass alloy compositions have liquidus temperatures within the range of 900° to 1200° C. and glass temperatures within the range of 300° to 500° C. depending on the constituents of the compositions. The film forming metal compositions at temperatures at which they are molten, e.g. above their liquidus temperatures are fluid and flows easily.

The glass and metal film forming compositions at the blowing temperatures, are molten, fluid and flows easily. The molten glass and molten metal just prior to the blowing operation have a viscosity of 10 to 600 poises, preferably 20 to 350 poises, and more preferably 30 to 200 poises.

Where the process is used to make non-filamented glass or non-filamented metal microspheres, the liquid glass or metal just prior to the blowing operation can have a viscosity of 10 to 200 poises, preferably 20 to 100 poises, and more preferably 25 to 75 poises.

Where the process is used to make filamented glass or filamented metal microspheres, the liquid glass or metal just prior to the blowing operation can have a viscosity of 50 to 600 poises, preferably 100 to 400 poises, and more preferably 150 to 300 poises.

The organic film forming materials and/or plastic compositions of the present invention are in a liquid-fluid form at the desired blowing temperature and during the blowing operation. The liquid plastic composition can be at a temperature of about 0° C. to about 400° C., preferably 10° to 300° C. and more preferably 20° to 200° C., depending on the constituents and state of polymerization of, for example, the plastic composition. The plastic composition at the blowing temperature is liquid, fluid and flows easily. The liquid plastic just prior to the blowing operation can have a viscosity of 0.10 to 600 poises, usually 10 to 350 poises and more usually 30 to 200 poises. Where the process is used to make non-filamented microspheres, the liquid plastic just prior to the blowing operation can have a viscosity of 0.1 to 200 poises, preferably 0.5 to 100 poises, and more preferably 5.0 to 50 poises. Where the process is used to make filamented microspheres, the liquid plastic just prior to the blowing operation can have a viscosity of 50 to 600 poises, preferably 80 to 400 poises, and more preferably 100 to 300 poises. The viscosity can be measured by conventional means, e.g. using a Brookfield viscometer.

A feature of the present invention is that the formation of the hollow film forming material microspheres can be carried out at low viscosities relative to the viscosities heretofore used in the prior art processes that utilized latent liquid or solid blowing agents dispersed throughout or contained in the glass compositions used to blow the microspheres. Because of the ability to utilize comparatively low viscosities, applicant is able to obtain hollow microspheres, the wall of which are free of any entrapped or dissolved gases or bubbles. With the low viscosities used by applicant, any entrapped or dissolved gases diffuse out and escape from the film forming material film surface during the bubble formation. With the high viscosities required to be used in the prior art latent blowing processes, any dissolved gases are trapped in the walls of the microspheres as they are formed because of the high viscosities required to be used.

The molten or liquid film forming material fed to the coaxial blowing nozzle can be at about ambient pressure or can be at an elevated pressure. The molten or liquid feed when used for low pressure applications can be at a pressure of 5 to 100 psig.

Where the process is used to make microspheres for use as insulating materials and in insulating systems, for use in syntactic foam systems and as filler materials in general, the liquid fed to the coaxial blowing nozzle can also be at a pressure of 1 to 1000 psig, preferably 3 to 100 psig, and more preferably 5 to 50 psig.

The ambient pressure external to the blowing nozzle can be at about atmospheric pressure or can be at subatmospheric or superatmospheric pressure. Where it is desired to have a relatively or high pressure of contained gas in the microsphere, the ambient pressure external to the blowing nozzle is maintained at a superatmospheric pressure. The ambient pressure external to the blowing nozzle will, in any event, be such that it substantially balances, but is slightly less than the blowing gas pressure.

The molten or liquid fed is continuously fed to the coaxial blowing nozzle during the blowing operation to prevent premature breaking and detaching of the elongated cylinder-shaped molten liquid film as it is being formed by the blowing gas.

The blowing gas, e.g. inert blowing gas, will be at about the same temperature as the molten or liquid film forming material being blown. The blowing gas temperature can, however, be at a higher temperature than the molten material to assist in maintaining the fluidity of the hollow molten material microsphere during the blowing operation or can be at a lower temperature than the molten material to assist in the solidification and hardening of the hollow molten film forming material microsphere as it is formed. The pressure of the blowing gas is sufficient to blow the microsphere and will be slightly above the pressure of molten film forming material at the orifice 7a of the outer nozzle 7. The blowing gas pressure will also depend on and be slightly above the ambient pressure external to the blowing nozzle.

The temperatures of the blowing gases will depend on the blowing as used and the viscosity-temperature-shear relationship of the film forming materials used to make the microspheres.

The transverse jet inert entraining fluid which is directed over and around the coaxial blowing nozzle to assist in the formation and detaching of the hollow molten film material microsphere from the coaxial blowing nozzle can be at the temperature of the molten material being blown. Suitable entraining fluids can be gases such as nitrogen, air, steam and argon.

The transverse jet entraining fluid which is directed over and around the coaxial blowing nozzle to assist in the formation and detaching of the hollow liquid film forming material microsphere from the coaxial blowing nozzle can have a linear velocity in the region of microsphere formation of 1 to 120 ft/sec, usually 5 to 80 ft/sec and more usually 10 to 60 ft/sec.

Where the process if used to make non-filamented microspheres, the linear velocity of the trasverse jet fluid in the region of microsphere formation can be 30 to 120 ft/sec, preferably 40 to 100 ft/sec and more preferably 50 to 80 ft/sec.

Where the process is used to make filamented microspheres, the linear velocity of the transverse jet fluid in the region of the microsphere formation can be 1 to 50 ft/sec, preferably 5 to 40 ft/sec and more preferably 10 to 30 ft/sec.

The distance between filamented microspheres depends to some extent on the viscosity of the film forming material and the linear velocity of the transverse jet entraining fluid.

The quench fluid is at a temperature such that it rapidly cools the hollow molten film forming material microsphere to solidify, harden and strengthen the molten material before the inner gas pressure decreases to a value at which the hollow microsphere would collapse. The quench fluid used to cool the glass and metal microspheres can be at a temperature of 0° to 200° F., preferably 40° to 200° F. and more preferably 50° to 100° F.

The quench fluid used to cool the metal microspheres can also be at temperatures of −50° to −268° C., particularly when rapid cooling of the metal microspheres is desired.

The quench fluid can be a liquid, a liquid dispersion or a gas. Suitable quench fluids are steam, a fine water spray, air, nitrogen or mixtures thereof. The inert quench fluid can be ethylene glycol vapor or liquid, steam or mixtures thereof.

The time elapsed from commencement of the blowing of the fiber reinforced hollow film forming material glass or metal microspheres to the cooling and hardening of the microspheres can be 0.0001 to 1.0 second, preferably 0.0010 to 0.50 second and more preferably 0.010 to 0.10 second.

Suitable cooling rates for the metal glass microspheres are of the order of $10^{4°}$ to $10^{6°}$ C. per second, i.e. about $1.8\times10^{4°}$ to $1.8\times10^{6°}$ F. per second. The quench rate required will to some extent depend on the wall thickness of the microsphere.

The quench or heating fluid used to harden the plastic microspheres is at a temperature such that it rapidly cools or heats the microspheres to solidify, harden and strengthen the liquid plastic before the inner gas pressure decreases to a value at which the plastic microsphere would collapse or burst the microsphere. The quench cooling fluid can be at a temperature of 0° to 200° F., usually 40° to 200° F. and more usually 50° to 100° F. The heating fluid used to harden the microspheres can be at a temperature of 100° to 800° F., usually 200° to 600° F. and more usually 300° to 500° F., depending on the plastic composition.

The time elapsed from commencement of the blowing of the plastic microspheres to the cooling and initial hardening of the microspheres can be 0.0001 to 60.0 seconds, preferably 0.0010 to 30.0 seconds and more preferably 0.10 to 10.0 seconds.

Where a thermosetting plastic composition is used to form the microsphere, the time elapsed from commencement of the blowing of the plastic microsphere to the heating and curing of the microsphere for it to have sufficient strength to maintain its size and shape can be 0.10 second to 30 minutes, preferably 1 second to 20 minutes and more preferably 10 seconds to 10 minutes.

APPARATUS

Referring to FIG. 1 of the drawings, the refractory vessel 1 is constructed to maintain the fiber and molten film forming material composition at the desired operating temperatures. The fiber and molten composition 2 is fed to coaxial blowing nozzle 5. The coaxial blowing nozzle 5 consits of an inner nozzle 6 and an outer nozzle 7. The inner nozzle 6 and outer nozzle 7 form annular space 8 which provides a flow path through which the fiber and molten film forming material composition 2 is extruded.

The orifice 6*a* of inner nozzle 6 terminates a short distance above the plane of orifice 7*a* of outer nozzle 7. The fiber and film forming material composition 2 flows downwardly and is extruded through annular space 8 and fills the area between orifice 6*a* and 7*a*. The surface tension forces in the molten composition 2 form a thin liquid molten film 9 across orifice 6*a* and 7*a* which has about the same or a smaller thickness as the distance of orifice 6*a* is spaced above orifice 7*a*. The orifices 6*a* and 7*a* can be made from stainless steel, platinum alloys, glass or fused alumina. Stainless steel, however, is preferred.

The FIG. 1 blowing nozzle can be used to blow fiber and molten film forming material compositions at relatively low viscosities, for example, of 10 to 60 poises, and to blow fiber reinforced hollow microspheres of relatively thick wall size, for example, of 20 to 100 microns or more.

A blowing gas, e.g. inert blowing gas, is fed through inner coaxial nozzle 6 and brought into contact with the inner surface of molten film 9. The inert blowing gas exerts a positive pressure on the molten film to blow and distend the film outwardly and downwardly to form an elongated cylinder-shaped liquid film 12 of molten film forming material filled with the blowing gas 10. The elongated cylinder 12 is closed at its outer end and is connected to outer nozzle 7 at the peripheral edge of orifice 7*a*.

The transverse jet 13 is used to direct an inert entraining fluid 14 through nozzle 13 and transverse jet nozzle orifice 13*a* at the coaxial blowing nozzle 5.

The process of the present invention was found to be sensitive to the distance of the transverse jet 13 from the orifice 7*a* of the outer nozzle 7, the angle at which the transverse jet was directed at coaxial blowing nozzle 5 and the point at which a line drawn through the center axis of transverse jet 13 intersected with a line drawn through the center axis of coaxial nozzle 5. The tranverse jet 13 is aligned to direct the flow of entraining fluid 14 over and around outer nozzle 7 in the microsphere forming region of the orifice 7*a*. The center axis of transverse jet 13 is aligned at an angle of 15° to 85°, preferably 25° to 75° and more preferably 35° to 55° relative to the center axis of the coaxial blowing nozzle 5.

The line drawn through the center axis of transverse jet 13 intersects the line drawn through the center axis of coaxial blowing nozzle 5 a point above the orifice 7*a* of outer nozzle 7. The transverse jet entraining fluid acts on the elongated-shaped cylinder 12 to flap and pinch it closed and to detach it from the orifice 7a of the outer nozzle 7 to allow the cylinder to fall free, i.e. be transported away from the outer nozzle 7 by the entraining fluid.

The transverse jet entraining fluid as it passes over and around the blowing nozzle fluid dynamically induces a periodic pulsating or fluctuating pressure field at the opposite or lee side of the blowing nozzle in the wake or shadow of the coaxial blowing nozzle. The entraining fluid assists in the formation and detaching of the hollow glass microsphere from the coaxial blowing nozzle.

The quench nozzles 18 are disposed below and on both sides of coaxial blowing nozzle 5 a sufficient distance apart to allow the microspheres 17 to fall between the quench nozzles 18. The quench nozzles 18 direct cooling fluid 19 at and into contact with the molten film forming material microspheres 17 to rapidly cool and solidify the molten film forming material and form a hard, smooth fiber reinforced hollow microsphere.

The FIG. 2 of the drawings illustrates a preferred embodiment of the method of the invention. It was found that in blowing fiber and molten film forming material compositions at high viscosities that it was advantageous to immediately prior to blowing the fiber and molten composition to provide by extrusion a very thin molten liquid film for blowing into the elongated cylinder shape liquid film 12. The thin molten liquid film 9 is provided by having the lower portion of the outer coaxial nozzle 7 tapered downwardly and inwardly at 21.

The thickness of the molten liquid film 9 can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the molten film forming material composition 2 through annular space 8 the molten film forming material 2 can be squeezed or extruded through the very fine gap to form a relatively thin molten liquid film 9.

The proper gap can best be determined by pressing the inner coaxial nozzle 6 downward with sufficient pressure to completely block-off the flow of molten film forming material, and to then very slowly raise the inner coaxial nozzle 6 until a stable system is obtained, i.e. until the fiber reinforced hollow microspheres are being formed.

The tapered nozzle construction illustrated in FIG. 2 can be used to blow film forming compositions at relatively high viscosities as well as to blow glass compositions at the relatively low viscosities referred to with regard to FIG. 1 of the drawings. The FIG. 2 embodiment of the invention is of particular advantage in blowing the thin walled fiber reinforced microspheres for use in or as fillers and in or as insulating materials.

When blowing high or low viscosity fiber compositions, it was found to be advantageous to obtain the very thin molten fluid film and to continue during the blowing operation to supply fiber and molten film forming material to the elongated cylinder-shaped liquid film as it was formed.

The tapered nozzle configuration of FIG. 2 is also particularly useful in aligning the fibers. The passage of the fibers and molten material through the fine or narrow gap serves to align the fibers with the walls, i.e. parallel to the walls, of the microspheres as the microspheres are being formed as shown in FIG. 6.

With reference to FIG. 3 of the drawings which illustrates an embodiment of the present invention in which a high viscosity fiber and film forming material or composition is used to blow filamented hollow microspheres, there is shown the formation of the uniform diameter microspheres spaced about equal distances apart. The numbered items in this drawing have the same meanings as discussed above with reference to FIGS. 1 and 2.

DESCRIPTION OF THE MICROSPHERES

The fiber reinforced hollow microspheres made in accordance with the present invention can be made from a wide variety of film forming materials and compositions. The fiber reinforced hollow microspheres made in accordance with the present invention can be made from suitable inorganic and organic film forming material compositions.

The hollow microspheres can be made from film forming glass, metal, metal glass and plastic compositions. The compositions that can be used are those that have the necessary viscosities, as mentioned above, when being blown to form stable films and which have a rapid change from the molten or liquid state to the solid or hard state with a relatively narrow temperature change. That is, they change from liquid to solid within a relatively narrowly defined temperature range.

The fiber reinforced hollow film forming material microspheres made in accordance with the present invention are substantially uniform in diameter and wall thickness, and have a hard smooth surface. The fiber reinforced hollow microspheres have the fibers substantially uniformly distributed in the wall of the microspheres. The wall of the microspheres are smooth and are free or substantially free of any holes, relatively thinned wall portions or sections, sealing tips, trapped gas bubbles, or sufficient amounts of dissolved gases to form bubbles. The microspheres are also free of any latent solid or liquid blowing gas materials or gases.

The microspheres, because the walls contain fibers uniformly dispersed therein and because the walls are substantially free of any holes, thinned sections, trapped gas bubbles, and/or sufficient amounts of dissolved gases to form trapped bubbles, are substantially stronger than the microspheres heretofore produced. The absence of a sealing tip also makes the microsphere stronger. The reinforcing fibers act to substantially increase the tensile strength of the microspheres.

The fiber reinforced microspheres can be made in various diameters and wall thickness, depending upon the desired end use of the microspheres. The microspheres can have an outer diameter of 200 to 10,000 microns, preferably 500 to 6000 microns and more preferably 1000 to 4000 microns. The microspheres can have a wall thickness of 1.0 to 1000 microns, preferably 5.0 to 400 microns and more preferably 10 to 100 microns.

Without intending to be limiting but rather to be used as a point of reference the Table II below provides exemplary relationship between the fiber diameter and length, ratio of fiber length to microsphere diameter, the diameter of the microspheres, microsphere wall thickness and ratio of microsphere wall thickness to diameter of the microsphere.

TABLE II

|  | Broad | Preferred | More Preferred |
|---|---|---|---|
| Microsphere Diameter (microns) | 200 to 10,000 | 500 to 6000 | 1000 to 4000 |
| Wall Thickness (microns) | 1.0 to 1000 | 5.0 to 400 | 10 to 100 |
| Ratio of Wall Thickness to Microsphere Diameter | 1:4 to 1:500 | 1:10 to 1:300 | 1:20 to 1:200 |
| Fiber Diameter (microns) | 0.2 to 10 | 0.4 to 5.0 | 0.5 to 3 |
| Fiber Length (microns) | 2 to 500 | 5 to 100 | 5 to 20 |
| Fiber Ratio D/L | 1:3 to 1:100 | 1:5 to 1:50 | 1:10 to 1:20 |
| Ratio Fiber Length to Microsphere Wall Thickness | 1:10 to 10:1 | 1:5 to 5:1 | 1:5 to 2:1 |

The microspheres can contain a gas or an inert gas at superatmospheric pressure, about ambient pressure or a partial vacuum in the enclosed volume. The partial vacuum can be obtained by using a blowing gas which partially or completely condenses within the microsphere, e.g. a metal vapor blowing gas.

The microspheres can contain a high vacuum in the enclosed volume where a metal vapor is used as a blowing gas and the metal vapor is cooled, condenses and deposits as a thin metal coating on the inner wall surface of the hollow microsphere. The pressure in the microsphere will be equal to the vapor pressure of the deposited metal at ambient temperature.

The diameter and wall thickness of the fiber reinforced hollow microspheres will of course effect the average bulk density of the microspheres.

Where the microspheres are formed in a manner such that they are connected by continuous thin filaments, that is, they are made in the form of filamented microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/1000 to 1/30 of the diameter of the microspheres.

The addition of the reinforcing fibers to the film forming material composition acts to generally strengthen the connecting filaments.

Where the microspheres are used as insulating materials and in insulating systems, or in synthetic foam systems, or as filler material in general, the microspheres can have an outer diameter of 200 to 5000, preferably 500 to 3000 and more preferably 750 to 2000 microns. The microspheres can have a wall thickness of 1.0 to 500 microns, preferably 5.0 to 200 microns and more preferably 10 to 50 microns.

When used as insulating materials, the microspheres can contain a hard vacuum or can contain a low heat conductivity gas. When used as filler materials, the microspheres can have a contained gas pressure of 5 to 100 psia, preferably 5 to 75 psia and more preferably 5 to 12 psia.

The fiber reinforced hollow microspheres can be made into, e.g. a four by eight foot formed panel. The panel can be ¼ to 3 inches, for example, ½, 1, 1½ or 2 inches, in thickness.

The fiber reinforced hollow microspheres can be made into sheets or other shaped forms by cementing the microspheres together with a suitable resin or other adhesive or by fusing the microspheres together.

The fiber reinforced hollow microspheres of the present invention have a distinct advantage of being very strong and capable of supporting a substantial amount of weight or capable of containing substantial high internal gas pressures, see for example the Torobin U.S. Pat. No. 4,303,432.

The following examples illustrate the preparation of fiber reinforced hollow film forming material microspheres in accordance with the present invention which microspheres have uniform distribution of fibers in the walls of the microspheres.

EXAMPLES

Example 1

A glass composition comprising the following weight percent of constituents is used to make hollow glass microspheres: $SiO_2$ 59.5%, $Al_2O_3$ 19%, $CaO$ 8%, $MgO$ 7.0%, $B_2O_3$ 5% and $Na_2O$ 1.5%. About fifteen volume percent of silicon carbide fibers one microns in diameter and ten microns in length are added to molten glass and evenly dispersed throughout the molten glass.

The fiber and glass composition is heated to a temperature of 2650° to 2750° F. to from a fluid molten glass having a viscosity of 35 to 60 poises.

The fiber and molten glass is fed to the apparatus of FIG. 1 of the drawings. The molten glass passes through annular space 8 of blowing nozzle 5 and forms a thin liquid molten glass film across the orifices 6a and 7a. The blowing nozzle 5 has an outside diameter of 0.040 inch and orifice 7a has an inside diameter of 0.030 inch. The thin fiber and molten glass or liquid film has a diameter of about 0.030 inch and a thickness of about 0.005 inch. An inert blowing gas consisting of nitrogen at a temperature of 2650° F. and at a positive pressure is applied to the inner surface of the molten glass film causing the film to distend downwardly into an elongated cylinder shape with its outer end closed and its inner end attached to the outer edge or orifice 7a.

The transverse jet is used to direct an inert entraining fluid which consists of nitrogen at a temperature of 2600° F. over and around the blowing nozzle 5 which entraining fluid assists in the formation and closing of the elongated cylinder shape and the detaching of the cylinder from the blowing nozzle and causing the cylinder to fall free of the blowing nozzle and to be entrained in the entraining fluid. The transverse jet is aligned at an angle of 35° to 45° relative to the blowing nozzle and a line drawn through the center axis of the transverse jet intersects a line drawn through the center axis of the blowing nozzle 5 at a point about 1 to 3 times the outside diameter of the coaxial blowing nozzle 5 above the orifice 7a.

The falling, i.e. entrained, elongated cylinders quickly assume a spherical shape and are rapidly cooled by ambient air to about ambient temperature which quickly cools, solidifies and hardens the fiber reinforced glass microspheres.

Clear, smooth, fiber reinforced hollow glass microspheres having uniform 2000 to 3000 micron diameter, uniform 20 to 40 micro wall thickness and filled with nitrogen gas at an internal contained pressure of about 3 psia are obtained. The microspheres are closely examined and are found to have the silicon carbide fibers evenly dispersed throughout the walls of the microspheres and the walls to be free of any entrapped bubbles and/or holes and are suitable for use as filler materials.

Example 2

A glass composition comprising the following constituents is used to make fiber reinforced hollow glass filamented microspheres: $SiO_2$ 59.5%, $Al_2O_3$ 19%, CaO 8%, MgO 7.0%, $B_2O_3$ 5% and $Na_2O$ 1.5%. About twenty volume percent of silicon carbide fibers, one half micron in diameter and five microns in length, are added to the molten glass. The fibers are evenly dispersed throughout the molten glass by stirring or other suitable means.

The fiber and molten glass composition is heated to a temperature of 2500° to 2600° F. to form a fluid molten glass having a viscosity of 100 to 200 poises.

The fiber and molten glass composition is fed to the apparatus of FIGS. 2 and 3 of the drawings under conditions similar to those used in Example 1.

An inert blowing gas, e.g. nitrogen, at a temperature of 2400° F. and at a positive pressure is applied to the inner surface of the molten glass film causing the film to distend outwardly into an elongated cylinder shape with its outer end closed and its inner end attached to the outer edge of orifice 7a.

The transverse jet is used to direct an entraining fluid which consists of nitrogen gas at a temperature of 2400° F. at a linear velocity of 5 to 40 feet a second over and around the blowing nozzle 5 which entraining fluid assists in the formation and closing of the elongated cylinder shape and the detaching of the cylinder from the blowing nozzle while trailing a thin glass filament which is continuous with the next microsphere forming at the blowing nozzle. The fiber reinforced filamented microspheres are otherwise formed in the manner illustrated and described with reference to Example 1 and FIG. 1 of the drawings.

The entrained elongated filamented cylinder filled with the blowing gas assumes a spherical shape. The filamented microspheres are contacted with ambient air which quickly cools, solidifies and hardens the molten glass.

Clear, smooth, fiber reinforced hollow filamented glass microspheres having uniform diameters of about 1500 to 2500 micron diameter, and uniform 5.0 to 10.0 micron wall thickness are obtained. The lengths of the filament portions of the filamented microspheres is 10 to 20 times the diameter of the microspheres. The fiber reinforced hollow glass microspheres are closely examined and are found to have the fibers uniformly distributed in the walls of the microspheres and the walls to be free of any entrapped bubbles and/or holes.

Example 3

The FIG. 4 of the drawings illustrates the use of the fiber reinforced hollow glass microspheres of the present invention in the construction of a one inch thick formed wall panel. The wall panel contains multiple layers of uniform size fiber reinforced glass microspheres made by the method of Example 2 of the invention. The microspheres have a 1500 to 2500, e.g. 2000, micron diameter, a 5.0 to 10.0, e.g. 5.0, micron wall thickness.

The interstices between the microspheres is filled with a resin adhesive foam. The microspheres are treated with a thin adhesive coating and formed into a ⅞ inch thick layer. The adhesive is allowed to cure to to form a semi-rigid wall board. The cured panels form strong wall panels which can be sawed and nailed and readily used in construction of new homes.

Example 4

In another embodiment of the invention, fiber reinforced hollow glass microspheres of the present invention are used in the construction of a formed wall panel one inch thick. The wall panel contains hollow glass microspheres made by the method of Example 2. the microspheres have a 1500 to 2500, e.g. 2000, micron diameter, and a 5.0 to 10.0, e.g. 5.0, micron wall thickness. The microspheres are heated to soften the glass to make the microspheres flexible. The heated microspheres and formed into a layer on inch thick and pressed and flattened between two flat plates to form the microspheres into an oblate spheroid shape in which the ratio of the height to length of the flattened microspheres is about 1:3. The flattened microspheres are held in this position until the microspheres become fused together. The microspheres are then allowed to cool and retain their flattened shape to form panels similar to that illustrated in FIG. 5 of the drawings. The panels are cured and form strong wall panels which can be sawed and nailed and readily used in construction of new homes.

Example 5

A film forming metal material composition is used to make fiber reinforced hollow metal microspheres.

About twenty-two volume percent of metal fibers, one micron in diameter and ten microns in length are added to the molten film forming material metal. The metal fibers are selected to have a melting temperature above the melting temperature of the film forming metal.

The fiber and metal composition is heated to a sufficiently high temperature to form a fluid molten metal. The molten metal just prior to the blowing operation, i.e. just before the beginning of the blowing of the microsphere, can have a viscosity of 35 to 60 poises.

The fiber and molten metal composition is fed to the apparatus of FIG. 1 of the drawings. The fiber and molten metal passes through annular space 8 of blowing nozzle 5 and forms a thin liquid molten metal film across the orifices 6a and 7a. The blowing nozzle 5 has an outside diameter of 0.040 inch and orifice 7a has an inside diameter of 0.030 inch. The thin liquid molten metal film has a diameter of 0.030 inch and a thickness of 0.005 inch. An inert blowing gas consisting of nitrogen at about the temperature of the molten metal and at a positive pressure is applied to the inner surface of the molten metal film causing the film to distend downwardly into an elongated cylinder shape with its outer end closed and its inner end attached to the outer edge of orifice 7a.

The transverse jet is used to direct an inert entraining fluid which consists of nitrogen at about the temperature of the fiber and molten metal composition over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 45° relative to the blowing nozzle.

The free falling, i.e. entrained, elongated cylinders quickly assume a spherical shape and are rapidly cooled to about ambient temperature by a dispersion of quench fluid at a temperature of −60° to −100° C. which quickly cools, solidifies and hardens the fiber reinforced metal microsphere.

Smooth, hollow fiber reinforced metal microspheres having uniform 2000 to 3000 micron diameter, uniform 20 to 40 micron wall thickness and filled with nitrogen gas at an internal contained pressure of about 3 psia are obtained. The walls of the metal microspheres have metal fibers uniformly dispersed in the walls and the microspheres are suitable for use as filler materials and suitable for use in making light weight metal articles.

EXAMPLE 6

A thermoplastic polyethylene polymer composition is used to make hollow plastic microspheres. There is added to the polymer about twenty-two volume percent of glass fibers, one micron in diameter and twenty microns in length.

The glass fiber and plastic composition is heated to form a fluid have a viscosity of about 10 to 20 poises at the blowing nozzle.

The fiber and liquid plastic is fed to the apparatus of FIG. 1 of the drawings. The liquid plastic passes through annular space 8 of blowing nozzle 5 and forms a thin liquid plastic film across the orifices 6a and 7a. The blowing nozzle 5 has an outside diameter of 0.040 inch and orifice 7a has an inside diameter of 0.030 inch. The thin liquid molten plastic film has a diameter of 0.030 inch and a thickness of 0.005 inch. A heated blowing gas consisting of nitrogen at a positive pressure, is applied to the inner surface of the liquid plastic film causing the film to distend downwardly into an elongated cylinder shape with its outer end closed and its inner end attached to the outer edge of orifice 7a.

The transverse jet is used to direct an entraining fluid which consists of heated nitrogen over and around the blowing nozzle 5. The transverse jet is aligned at an angle of 35° to 45° relative to the blowing nozzle.

The entrained falling elongated cylinders assume a spherical shape, are cooled to about ambient temperature by a cool quench fluid consisting of a fine water spray which quickly cools, solidifies and hardens the plastic microspheres.

Uniform sized, smooth, fiber reinforced hollow plastic microspheres having uniform 2000 to 3000 micron diameter, uniform 20 to 40 micron wall thickness and filled with nitrogen gas are obtained. The microspheres are examined and the walls are found to have fibers uniformly dispersed in the walls and the walls are found to be free of holes and free of any trapped gas bubbles.

EXAMPLE 7

A thermosetting plastic composition comprising a mixture of 50% by weight acrylonitrile and 50% by weight vinylidene chloride and a suitable catalyst is used to make hollow plastic microspheres.

About fifteen volume percent of plastic fibers, having a diameter of one micron and a length of ten microns is added to the composition. The plastic fiber material is selected to have an melting temperature 100° C. higher than the blowing temperature of the thermosetting plastic.

The fiber and plastic composition mixture at the blowing nozzle has a viscosity of about ten poises.

The fiber and liquid plastic mixture is heated and is fed to the apparatus of FIG. 2 of the drawings. The liquid plastic is passed through annular space 8 of blowing nozzle 5 and into tapered portion 21 of outer nozzle 7. The liquid plastic under pressure is squeezed and extruded through a fine gap formed between the outer edge of orifice 6a and the inner surface 22 of the tapered portion 21 of outer nozzle 7 and forms a thin liquid plastic film across the orifices 6a and 7a. The blowing nozzle 5 has an outside diameter of 0.04 inch and orifice 7a has an inside diameter of 0.01 inch. The thin liquid plastic film has a diameter of 0.01 inch and thickness of 0.003 inch. A heated blowing gas consisting of nitrogen at a positive pressure is applied to the inner surface of the liquid plastic film causing the film to distend outwardly into an elongated cylinder shape with its outer end closed and its inner end attached to the outer edge of orifice 7a.

The transverse jet is used to direct an entraining fluid which consists of heated nitrogen over and around the blowing nozzle. The transverse jet is aligned at an angle of 30° to 45° relative to the blowing nozzle.

The entrained falling elongated cylinders filled with the blowing gas quickly assume a spherical shape. The microspheres are contacted with a heating fluid consisting of heated nitrogen which solidifies, hardens and begins to cure the liquid plastic.

Uniform size diameter, smooth, hollow fiber reinforced plastic microsphere having an about 800 to 900 micron diameter and uniform walls of about 8 to 20 micron wall thickness and an internal pressure of about 12 psia are obtained. The fiber reinforced hollow microspheres are examined and are found to have plastic fibers uniformly dispersed in the walls and to be free of holes and any trapped bubbles.

UTILITY

The fiber reinforced hollow microspheres can be made from glass, metal and plastic molten film forming materials using the methods illustrated in the foregoing examples. The molten film forming materials can have added to them ceramic, glass metal or plastic fibers, providing that at the melting and blowing temperatures, the fibers are not changed in structure or chemical form. The fibers do not have to be made from the same materials as the molten film forming material.

The fiber reinforced hollow microspheres of the present invention have many uses including the use of the microspheres as a filler or aggregate in cement, plaster and asphalt and synthetic construction board materials and use in the manufacture of insulating materials.

The fiber reinforced hollow microspheres can be bonded together by fusion, sintering or suitable resin adhesives and molded into sheets or other forms and used in new constructions.

The fiber reinforced microspheres may be adhered together with known adhesives or binders to produce semi- or rigid cellular type materials for use in manufacturing various products or in construction.

The fiber reinforced glass and plastic microspheres of the present invention can be used to make wallboard and ceiling tiles. The fiber reinforced glass microspheres can also advantageously by used in plastic or resin boat construction to produce high strength hulls and/or hulls which themselves are buoyant. The fiber reinforced metal microspheres can be used to make light weight structural members for the construction of airplanes.

In carrying out the process of the present invention, the film forming material to be used to form the microspheres is selected and can be treated and/or mixed with other materials to adjust the viscosity and surface tension characteristics such that at the desired blowing temperatures the materials are capable of forming hollow microspheres of the desired size and wall thickness.

The process described herein can also be used to encapsulate and store gaseous material, for example, in fiber reinforced hollow glass or metal microspheres of a suitable non-interacting composition, thereby allowing storage or handling of gases at high pressures. Because of the microsphere small size and high tensile strength, the gases may be encapsulated into the fiber reinforced hollow microspheres at elevated pressures, thus allowing high pressure storage of gases.

These and other uses of the present invention will become apparent to those skilled in the art from the foregoing description and the following appended claims.

It will be understood that various changes and modifications may be made in the invention, and that the scope thereof is not to be limited except as set forth in the claims.

What is claimed is:

1. A method for making fiber reinforced hollow microspheres from a film forming material which comprises adding fibers to a film forming material, uniformly dispersing said fibers in the film forming material, forming a liquid film of said fibers and film forming material across an orifice, applying a blowing gas at a positive pressure on the inner surface of the liquid film to blow the film and form the microsphere, subjecting the microsphere during its formation to an external pulsating or fluctuating pressure field having periodic oscillations, said pulsating or fluctuating pressure field acting on said microsphere to assist in its formation and to assist in detaching the microsphere from said orifice, hardening said microspheres and obtaining hollow fiber reinforced microspheres having fibers uniformly distributed in the walls of said microspheres.

2. The method of claim 1 wherein an entraining fluid is directed at an angle to a coaxial blowing nozzle having an orifice, an inner nozzle and an outer nozzle, the liquid film of film forming material is formed across the orifice, the blowing gas is conveyed to the inner surface of the liquid film through said inner nozzle, the fiber and film forming material is conveyed through said outer nozzle to said orifice, and the entraining fluid passes over and around said coaxial nozzle to fluid dynamically induce a pulsating or fluctuating pressure field at the opposite or lee side of the blowing nozzle in the wake or shadow of the coaxial blowing nozzle.

3. The method of claim 2 wherein the lower portion of the outer nozzle is tapered inwardly to form with the outer edge of the orifice of the inner nozzle a fine gap and the fiber and film forming material is fed under pressure and extruded through said gap to form a thin film of the fiber and film forming material across the orifice of the blowing nozzle.

4. The method of claim 2 wherein said entraining fluid is directed at said coaxial blowing nozzle at an angle of 15° to 85° relative to a line drawn through the center axis of said coaxial blowing nozzle and said outer nozzle.

5. The method of claim 2 wherein quench means provide a quench fluid to contact with said microsphere to rapidly cool and solidify said microsphere.

6. The method of claim 2 wherein the film forming material has a viscosity of 10 to 600 poises.

7. The method of claim 2 wherein the film forming material has a viscosity of 20 to 100 poises.

8. The method of claim 2 wherein the film forming material has a viscosity of 100 to 400 poises.

9. The method of claim 8 wherein said entraining fluid has a linear velocity in the region of microsphere formation of 40 to 100 ft/sec.

10. The method of claim 8 wherein said entraining fluid has a linear velocity in the region of microsphere formation of 5 to 40 ft/sec.

11. The method of claim 2 wherein said entraining fluid has a linear velocity in the region of microsphere formation of 1 to 120 ft/sec and entrains and transports the microspheres away from the blowing nozzle.

12. The method of claim 1 wherein the film forming material is selected from the group consisting of glass, metal, metal glass and plastic film forming material.

13. The method of claim 1 wherein the fiber is selected from the group consisting of ceramic, glass, metal, metal glass and plastic fibers.

14. A method for making fiber reinforced hollow film forming material microspheres which comprises adding fibers to said film forming material, uniformly dispersing said fibers in the film forming material, forming a molten or liquid film forming material, forming a liquid film of said material across an orifice of a coaxial blowing nozzle, said blowing nozzle having an inner nozzle to convey a blowing gas to the inner surface of the liquid film and an outer nozzle to convey said liquid or molten material to said orifice, applying said blowing gas through said inner nozzle at positive pressure on the inner surface of the liquid film to blow the film downwardly and outwardly to form the microsphere, continuously feeding said film forming material to said outer nozzle while said microsphere is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and solidifying said microsphere and obtaining fiber reinforced hollow microspheres in which the fibers are uniformly dispersed in the walls of the microspheres.

15. The method of claim 14 wherein the lower portion of the outer nozzle is tapered inwardly to form with the outer edge of the orifice of the inner nozzle a fine gap and feeding the fiber and liquid film forming material under pressure through said gap to form a thin film of the fiber and film forming material across the orifice of the blowing nozzle.

16. The method of claim 15 wherein fibers as they pass through said gap are aligned in a direction such that the length of the fiber is parallel to the wall of the film of the film forming material.

17. The method of claim 15 wherein the film forming material comprises molten glass.

18. The method of claim 15 wherein the film forming material comprises molten metal.

19. The method of claim 15 wherein the film forming material comprises molten metal glass.

20. The method of claim 15 wherein the film forming material comprises a liquid organic plastic or resin.

21. The method of claim 15 wherein fiber reinforced hollow microspheres having uniform diameters of 200 to 10,000 microns and uniform wall thickness of 1 to 1000 microns are obtained.

22. The method of claim 15 wherein fiber reinforced hollow microspheres having uniform diameters of 500 to 6000 microns and uniform wall thickness of 5 to 400 microns are obtained.

23. The method of claim 15 wherein the fibers comprise 3 to 30 percent by volume of the film forming material.

24. The method of claim 15 wherein the fibers comprise 10 to 25 percent by volume of the film forming material.

25. The method of claim 15 wherein the fibers have a diameter of 0.4 to 5 microns and a length of 5 to 100 microns.

26. The method of claim 15 wherein the fibers have a diameter of 0.5 to 3 microns and a length of 5 to 20 microns.

27. Fiber reinforced hollow film forming material microspheres of substantially uniform diameter of 200 to 10,000 microns and of substantially uniform wall thickness of 1.0 to 1000 microns, wherein the fibers are uniformly distributed in the walls of said microspheres and said microspheres are free of latent solid or liquid blowing gas materials or gases and the walls of said microspheres are substantially free of holes, relatively thinned wall portions or sections and bubbles.

28. The fiber reinforced hollow film forming material microspheres of claim 27 wherein the microspheres have a diameter of 500 to 6000 microns and a wall thickness of 5 to 400 microns.

29. The fiber reinforced hollow film forming material microspheres of claim 28 having a diameter of 500 to 3000 microns and a wall thickness of 5.0 to 200 microns.

30. The fiber reinforced hollow microspheres of claim 27 having a contained gas pressure of 5 to 100 psia.

31. The fiber reinforced hollow microspheres of claim 27 wherein the film forming material comprises glass.

32. The fiber reinforced hollow microspheres of claim 27 wherein the film forming material comprises metal.

33. The fiber reinforced hollow microspheres of claim 27 wherein the film forming material comprises metal glass.

34. The fiber reinforced hollow microspheres of claim 27 wherein the film forming material comprises an organic plastic or resin.

35. The fiber reinforced hollow microspheres of claim 27 wherein the fibers comprise 3 to 30 percent by volume of the film forming material composition.

36. The fiber reinforced hollow microspheres of claim 27 wherein the fibers comprise 10 to 25 percent by volume of the film forming material composition.

37. The fiber reinforced microspheres of claim 27 wherein the fibers have a diameter of 0.4 to 5 microns and a length of 5 to 100 microns.

38. The fiber reinforced microspheres of claim 27 wherein the fibers have a diameter of 0.5 to 3 microns and a length of 5 to 20 microns.

39. The fiber reinforced microspheres of claim 27 wherein the fiber is selected from the group consisting of ceramic, glass, metal, metal glass and organic plastic or resin fibers.

40. Filamented, fiber reinforced hollow film forming material microspheres having a diameter of 200 to 10,000 microns and having a wall thickness of 1.0 to 1000 microns, wherein the fibers are uniformly dispersed in the walls of said microspheres and said microspheres are connected to each other by filament portions which are continuous with the microspheres and are the same film forming material from which the microspheres are made.

41. Filamented, fiber reinforced hollow film forming material microspheres of substantially uniform diameter of 500 to 6000 microns and of substantially uniform wall thickness of 5.0 to 400 microns, wherein said fibers are uniformly distributed in the walls of said microspheres and said microspheres are connected to each other by filament portions which are continuous with the microspheres and are of the same film forming material from which the microspheres are made, and said microspheres are free of latent solid or liquid blowing gas materials or gases, and the walls of said microspheres are substantially free of holes, relatively thinned wall portions or sections and bubbles.

42. The hollow microspheres of claim 41 wherein the length of the connecting filaments are substantially equal and is 2 to 20 times the diameter of the microspheres.

43. The hollow microspheres of claim 41 wherein the length of the connecting filaments is substantially equal and the diameter of the connecting filaments is 1/2500 to 1/20 the diameter of the microspheres.

44. A shaped form or formed mass of cemented or bonded together fiber reinforced hollow film forming material microspheres of substantially uniform diameter of 200 to 10,000 microns and of substantially uniform wall thickness of 1.0 to 1000 microns, wherein said fibers are uniformly distributed in the walls of said microspheres and said microspheres are free of latent solid or liquid blowing gas materials or gases and the walls of said microspheres are substantially free of holes, relatively thinned wall portions or sections and bubbles.

45. A shaped form or formed mass of cemented or bonded together fiber reinforced hollow film forming material microspheres of substantially uniform diameter of 500 to 6000 microns and of substantially uniform wall thickness of 5.0 to 400 microns, wherein said fibers are uniformly distributed in the walls of said microspheres and said microspheres are free of latent solid or liquid blowing gas materials or gases and the walls of said microspheres are substantially free of holes, relatively thinned wall portions or sections and bubbles.

46. The shaped form or formed mass of fiber reinforced microspheres of claim 45 wherein the microspheres are cemented together by fusion or sintering or are bonded together with an organic or inorganic bonding agent or adhesive.

47. The shaped form or formed mass of microspheres of claim 46 formed into a thin sheet or panel.

48. The microspheres of claim 45 having a diameter of 500 to 3000 microns and a wall thickness of 5.0 to 200 microns.

49. The microspheres of claim 23 having an oblate spheroid shape.

50. The shaped form or formed mass of fiber reinforced microspheres of claim 45 wherein the film forming material comprises a member selected from the group consisting of glass, metal, metal glass and an organic plastic or resin.

51. The shaped form or formed mass of fiber reinforced microspheres of claim 45 wherein the fibers comprise 3 to 30 percent by volume of the film forming material composition.

52. The shaped form or formed mass of fiber reinforced microspheres of claim 45 wherein the fibers comprise 10 to 25 percent by volume of the film forming material composition.

53. The shaped form or formed mass of fiber reinforced microspheres of claim 45 wherein the fibers have a diameter of 0.4 to 5 microns and a length of 5 to 100 microns.

54. The shaped form or formed mass of fiber reinforced microspheres of claim 45 wherein the fibers have a diameter of 0.5 to 3 microns and a length of 5 to 20 microns.

55. The shaped form or formed mass of fiber reinforced microspheres of claim 45 wherein the fiber is a member selected from the group consisting of ceramic, glass, metal, metal glass and organic plastic or resin fibers.

56. A shaped form or formed mass of cemented or bonded together filamented, fiber reinforced hollow film forming material microspheres having a uniform diameter of 200 to 10,000 microns and having a uniform wall thickness of 1.0 to 1000 microns, wherein the fibers are unformly distributed in the walls of said microspheres and said microspheres are connected to each other by filament portions which are continuous with the microspheres and are of the same inorganic film forming material from which the microspheres are made.

57. A shaped form or formed mass of cemented or bonded together filamented, fiber reinforced hollow film forming material microspheres of substantially uniform diameter of 500 to 6000 microns and of substantially uniform wall thickness of 5.0 to 400 microns, wherein the fibers are uniformly distributed in the walls of said microspheres and said microspheres are connected to each other by filament portions which are continuous with the microspheres and are of the same film forming material from which the microspheres are made, and said microspheres are free of latent solid or liquid blowing gas materials or gases, and the walls of said microspheres are substantially free of holes, relatively thinned wall portions or sections and bubbles.

58. The shaped form or formed mass of fiber reinforced microspheres of claim 57 wherein the microspheres are cemented together by fusion or sintering or are bonded together with an organic or inorganic bonding agent or adhesive.

59. The shaped form or formed mass of fiber reinforced microspheres of claim 57 formed into a thin sheet or panel.

60. The shaped form or formed mass of fiber reinforced microspheres of claim 57 wherein the microspheres have an oblate spheroid shape.

* * * * *